US009582120B2

(12) United States Patent
Kim

(10) Patent No.: US 9,582,120 B2
(45) Date of Patent: Feb. 28, 2017

(54) DISPLAY DEVICE, MOBILE TERMINAL AND METHOD OF CONTROLLING THE SAME

(71) Applicant: SAMSUNG ELECTRONICS CO., LTD., Suwon-si (KR)

(72) Inventor: Jong Hyuk Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/562,039

(22) Filed: Dec. 5, 2014

(65) Prior Publication Data

US 2015/0160786 A1    Jun. 11, 2015

(30) Foreign Application Priority Data

Dec. 10, 2013    (KR) .................. 10-2013-0153343

(51) Int. Cl.
*G06F 3/042*    (2006.01)
*G06F 3/03*    (2006.01)
*G06F 3/01*    (2006.01)

(52) U.S. Cl.
CPC ............ *G06F 3/0425* (2013.01); *G06F 3/017* (2013.01); *G06F 3/0321* (2013.01)

(58) Field of Classification Search
CPC ...... G06F 3/0346; G06F 3/017; G06F 3/0304; G06F 3/038; G06F 3/04812; G06F 3/048
See application file for complete search history.

(56) References Cited

U.S. PATENT DOCUMENTS

| 2003/0156756 A1* | 8/2003 | Gokturk | G06F 3/017 382/190 |
| 2013/0141327 A1* | 6/2013 | Wei | G06F 3/011 345/156 |
| 2013/0155237 A1* | 6/2013 | Paek | G06F 1/1632 348/148 |

FOREIGN PATENT DOCUMENTS

JP    5-189137 A    7/1993

OTHER PUBLICATIONS

Communication dated Apr. 30, 2015 issued by the European Patent Office in counterpart European Patent Application No. 14195270.5.
Communication dated Oct. 24, 2016 issued by the European Patent Office in counterpart European Patent Application No. 14195270.5.

* cited by examiner

*Primary Examiner* — Olga Merkoulova
(74) *Attorney, Agent, or Firm* — Sughrue Mion, PLLC

(57) ABSTRACT

A display device which may enhance recognition precision of an operation command input by a user, a mobile terminal which communicates with the display device, and a method of controlling the same are provided. The display device includes a display panel, an image collector configured to collect an image of an object in a first direction, a communicator configured to receive an image of the object collected in a second direction by a mobile terminal, and a controller configured to process the collected image and the received image together into a processed image, to recognize a motion of the processed image, determine an operation command corresponding to the recognized motion, and control an operation of the display panel based on the determined operation command.

24 Claims, 12 Drawing Sheets

(a)

(b)

(c)

DISPLAY DEVICE, MOBILE TERMINAL AND METHOD OF CONTROLLING THE SAME

CROSS-REFERENCE TO RELATED APPLICATION

This application claims priority from Korean Patent Application No. 10-2013-0153343, filed on Dec. 10, 2013 in the Korean Intellectual Property Office, the disclosure of which is incorporated herein by reference in its entirety.

BACKGROUND

1. Field

Apparatuses and methods consistent with exemplary embodiments relate to a display device which may enhance recognition precision of an operation command input by a user, a mobile terminal which communicates with the display device, and a method of controlling the same.

2. Description of the Related Art

A display device is a device for displaying visual and stereoscopic images.

Recent flat display devices have a reduced weight and volume, as compared to cathode ray tube display devices. Thus, the flat display device has more flexibility with respect to an installation space, and is also configured to easily embody a large screen and to be flat, and has various excellent performance characteristics such as high definition features.

As typical examples of such a display device, there are a liquid crystal display (LCD) device, an electro-luminescence display (ELD) device, a field emission display (FED) device, a plasma display panel (PDP) device, a TFT-LCD device, a flexible display device, and so on.

The display device communicates with a remote controller or the like, receives a user's command input to the remote controller, and then performs an operation corresponding to the command. Recently, voice recognition techniques and motion recognition techniques have been developed, and thus the user's command may be received through recognition of information (e.g., voice, motion) provided by the user, and then an operation corresponding to the command may be performed.

However, the remote controlling techniques using the remote controller have a problem in that the remote controllers which are different according to manufacturers of the display devices are not compatible with each other, and thus, each display device may not be controlled by other manufacturers' remote controllers.

Among the recognition techniques, the motion recognition technique is a technology in which the user's motion is recognized using a motion sensor or the like, and the information indicating the user's command is determined from the recognized motion. The voice recognition technique is a technology in which the user's voice command is recognized using a voice sensor or the like, and the information indicating the user's voice command is determined from the recognized voice command.

In such recognition techniques, if the user does not exactly input a motion or a voice command, the motion or the voice command may be recognized as other functions which are not intended by the user, or the recognition may not be performed, and thus it is inconvenient in that the user may need to repeatedly perform the same motion or repeat the same voice command.

Further, there is another problem in that the display device may perform a certain function due to a user' unintended motion or voice command.

Further still, when the motion recognition technique is applied to the display device, the motions which may be taken by the user are limited, and most of the motions are performed by the user's hands. Therefore, it is difficult to distinguish among the motions.

SUMMARY

One or more exemplary embodiments provide a display device which recognizes a motion using images collected from a plurality of image collection parts disposed in different directions from an object, and determines an operation command based on the recognized motion, and a method of controlling the same.

Further, one or more exemplary embodiments provide a display device which displays each image of the object collected in different directions from each other, and a method of controlling the same.

Further still, one or more exemplary embodiments provide a mobile terminal which collects images as a command for controlling an operation of the display device, and transmits the collected images to the display device.

In accordance with an aspect of an exemplary embodiment, there is provided a display device including a display panel, an image collector configured to collect an image of an object in a first direction, a communicator configured to receive an image of the object collected in a second direction by a mobile terminal, and a controller configured to process the collected image and the received image together into a processed image, to recognize a motion of the processed image, to determine an operation command corresponding to the recognized motion, and to control an operation of the display panel based on the determined operation command.

The second direction may be perpendicular to the first direction.

The display panel may be configured to display the collected image and the received image, respectively.

The display panel may be configured to display the collected image and the received image which are images of the object located in a recognition space area.

The recognition space area may be a hexahedral shape.

The recognition space area may include a plurality of surfaces, and the plurality of surfaces may include a first surface configured to face the display panel, a second surface configured to be opposite to the first surface, a third surface configured to face the mobile terminal, and a fourth surface configured to be opposite to the third surface.

The first surface may be parallel with the second surface, and perpendicular to the third and fourth surfaces.

The display panel may be configured to display the processed image which is captured in the recognition space area.

The display panel may be configured to display the processed image in a stereoscopic image.

The display panel may be configured to display an image of a plurality of keys having a plurality of respective operation commands, and may display a pointer indicated by the processed image, and the controller may be configured to recognize the motion of the processed image when displaying the image of the plurality of keys, and may determine a location of the pointer with respect to the plurality of keys based on the recognized motion.

The image of the object collected in the first direction and the image of the object collected in the second direction may be collected at the same time.

The motion of the object may be at least one of a motion of the object forming a shape and a location movement motion of the object.

When a command instructing the display device to operate in an interaction mode is input to the display device, the controller may be configured to activate the image collector, and may control the communicator to transmit a command signal starting the interaction mode to the mobile terminal.

The display device may further include an inputter through which a command instructing the display device to operate in an interaction mode is input.

In accordance with an aspect of another exemplary embodiment, there is provided a mobile terminal including a communicator configured to perform communication with a display device, an image collector configured to collect an image of an object in a different direction from a direction in which the display device collects another image of the object, and a controller configured to activate the image collector when a command instructing the mobile terminal to operate in an interaction mode is input to the mobile terminal, and to control the communicator to transmit the image collected from the image collector to the display device.

The mobile terminal may further include an inputter through which the command instructing the mobile terminal to operate in the interaction mode is input.

The controller may be configured to analyze the image of the object and the other image of the object, determine arrangement information indicating an arrangement of the mobile terminal with the display device based on the analyzed images, and output the determined arrangement information.

In accordance with still another aspect of an exemplary embodiment, there may be provided a display device including a display panel, and a controller configured to process a plurality of images collected in different directions from each other together into a processed image, to recognize a motion of the processed image, to determine an operation command corresponding to the recognized motion, and to control an operation of the display panel based on the determined operation command.

The plurality of images collected in the different directions from each other are collected images of an object located in a previously set recognition space area, and the display may be configured to display the plurality of images collected in the different directions from each other.

When a command instructing the display device to operate in an interaction mode is input to the display device, the controller may be configured to transmit an activation signal to a plurality of image collectors, and process the images transmitted from the plurality of image collectors together into the processed image.

In accordance an aspect of another exemplary embodiment, there is provided a method of controlling a display device including determining whether an input mode is an interaction mode, activating an image collector in the display device when the determining indicates that the input mode is the interaction mode, transmitting a command signal starting the interaction mode to an external mobile terminal, processing an image collected in a first direction by the image collector and another image collected in a second direction by the mobile terminal to generate a processed image and recognizing a motion of the processed image, determining an operation command corresponding to the recognized motion, and controlling an operation of a display panel based on the determined operation command.

The image collected in the first direction by the image collector and the image collected in the second direction by the mobile terminal are collected at the same time.

The image collected in the first direction by the image collector and the other image collected in the second direction by the mobile terminal are collected images of an object located in a previously set recognition space area, and the method may further include displaying the image collected in the first direction and the image collected in the second direction.

The recognizing of the motion may include recognizing at least one motion among a motion of an object forming a shape and a location movement of the object.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Reference will now be made in detail to the exemplary embodiments, examples of which are illustrated in the accompanying drawings.

Figure 1:
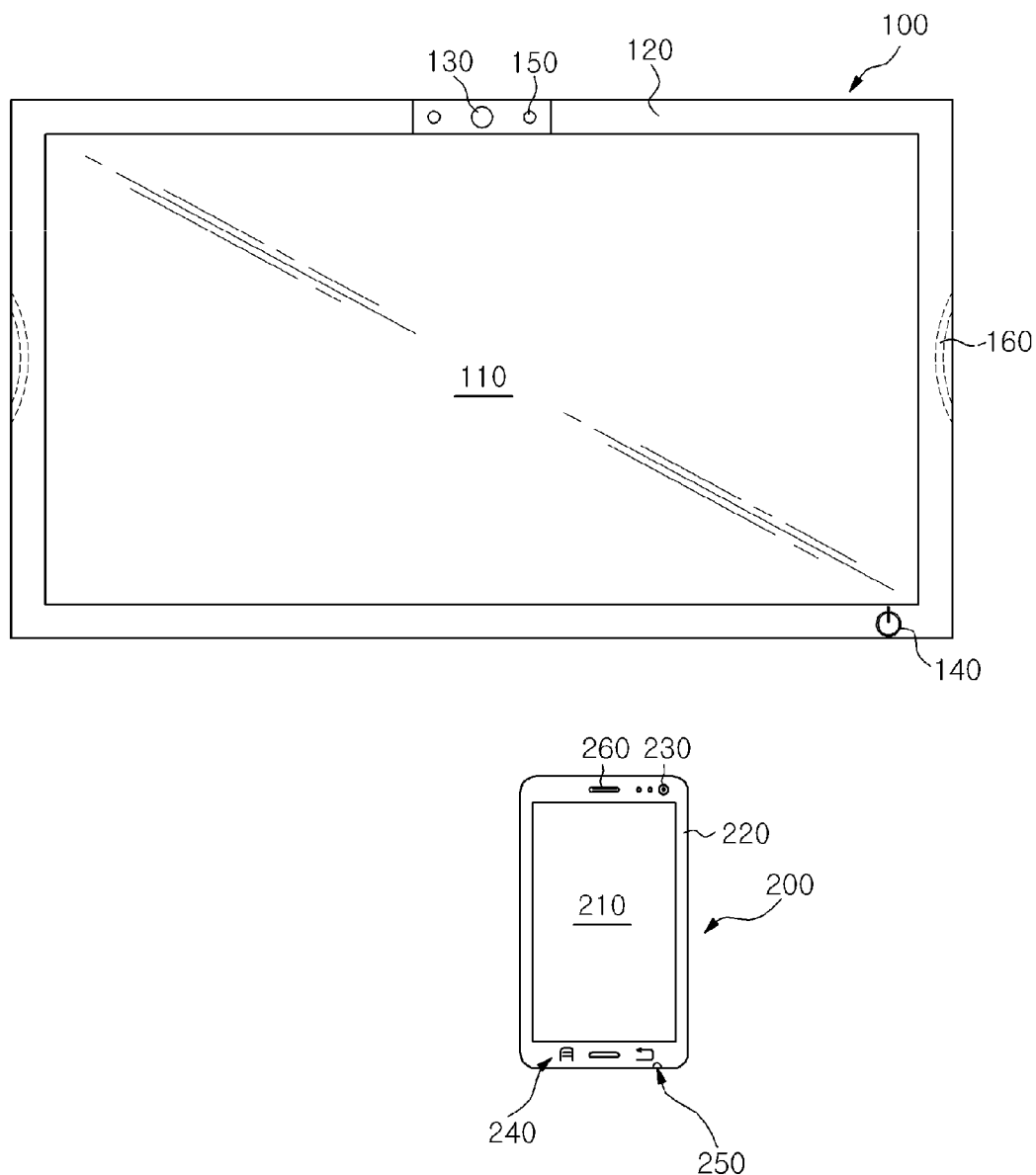
FIG. 1 is an exemplary view illustrating a display device and a mobile terminal configured to communicate with the display device in accordance with an exemplary embodiment.

FIG. 1 is an exemplary view illustrating a display device and a mobile terminal configured to communicate with the display device in accordance with an exemplary embodiment.

The display device 100, which may be implemented as many types of devices, such as television (TV), a monitor, a smartphone, a laptop, and a tablet, is a device having a function of displaying an image.

The mobile terminal 200 is a device having an image collection function, such as a camera, and a communication function, and may be implemented, for example, as a mobile communication terminal, a smartphone, a laptop, a tablet, an IP camera, and so on.

FIG. 1 illustrates the TV as an example of the display device 100, and the smartphone as an example of the mobile terminal 200.

Further, to distinguish between elements of the display device 100 and elements of the mobile terminal 200, a word "first" may be added to the elements of the display device, and a word "second" may be added to the elements of the mobile terminal.

The display device 100 includes a first display panel 110 configured to display an image, a first bezel 120 configured to cover a non-displaying area of the first display panel 110, a first image collection part (first image collector) 130 configured to collect image information, and a first input part (first inputter) 140 configured to input a user's operation command.

More specifically, the first display panel 110 may be configured as many different types of display panels, including, for example, an LCD, an ELD, an FED, a PDP, a TFT-LCD, and an OLED.

The first bezel 120 forms an exterior of the display device, and is coupled to a cover (not shown) configured to cover a rear surface of the display panel.

The first image collection part 130 is disposed in the first bezel 120 so that an image-taking module configured to collect an image is exposed to an outer side.

Further, the first image collection part 130 may be removably installed on the first bezel 120. The first image collection part 130 may be electrically connected with the display device 100 through a cable or the like.

The first input part 140 may be disposed on the first bezel 120, and includes one or a plurality of buttons.

According to an exemplary embodiment, for example, the plurality of buttons includes a power button, a channel/volume button, a screen control button, and so on.

The display device 100 may further include a first sound collection part 150 configured to collect sound information, and a first sound output part (first sound outputter) 160 configured to output a sound relevant to the image.

According to an exemplary embodiment, the first sound collection part 150 forms one MOIP (Multimedia Over Internet Protocol) together with the first image collection part 130.

That is, the MOIP includes a camera as the first image collection part 130, a plurality of microphones as the first sound collection part 150, and a microcomputer (not shown) configured to control operations of the camera and the plurality of microphones and to transmit an image signal and a sound signal collected from the camera and the plurality of microphones to a first control part (first controller) 170.

The MOIP may further include a communication part (not shown) such as an Ethernet device. The microcomputer of the MOIP compresses the image signal and the sound signal, and transmits the compressed data to the first control part 170 through the Ethernet device.

The MOIP is located at an upper end of the first bezel 120 to collect an image and a sound of a user and sounds around the user.

The MOIP may be installed at a place which enables the MOIP to easily collect the user's information, as well as the upper end of the first bezel 120.

Further, the MOIP may be separately provided from the display device 100. That is, the MOIP may be removable from the display device and may be connected to an interface device (not shown) provided at the display device 100 when being connected to the display device 100.

The camera and the plurality of microphones of the MOIP may be directly connected to the first control part 170 through the cable to directly transmit the image signal and the sound signal to the first control part 170.

The mobile terminal 200 includes a second display panel 210 configured to display an image, a second bezel 220 configured to cover a non-displaying area of the second display panel 210, a second image collection part (second image collector) 230 configured to collect the image information, and a second input part (second inputter) 240 configured to input the user's operation command.

More specifically, the second display panel 210 may be configured as at least one of many different types of display panels including, for example, a TFT-LCD, an LCD, and an AMOLED.

The mobile terminal 200 may further include a touch panel (not shown) disposed to be adjacent to the second display panel 210, and may use a touch signal input through the touch panel as an input signal.

The second image collection part 230 may be disposed on the second bezel 220, and may be disposed on at least one of a front surface and a rear surface of the second display panel 210.

The second input part 240 may be disposed on the second bezel 220, and may be configured with the touch panel or the like.

The mobile terminal 200 may further include a second sound collection part (second sound collector) 250 configured to collect the sound information, and a second sound output part (second sound outputter) 260 configured to output the sound.

The mobile terminal 200 may virtually output an image of a keyboard or a remote controller to a predetermined space.

The first image collection part 130 of the display device 100 and the second image collection part 230 of the mobile terminal 200 collect the image of the same object located at the same space. This will be described with reference to FIGS. 2 and 3.

Figure 2:
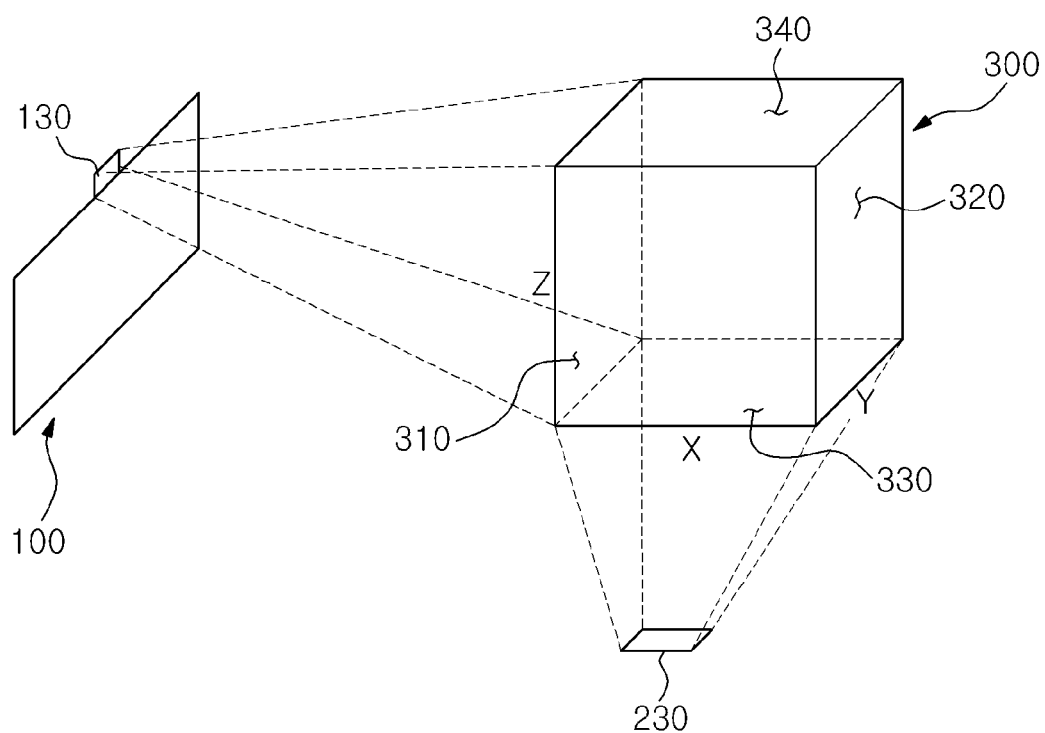
FIG. 2 is an exemplary view illustrating a collection area of images collected from a first image collection part of the display device and a second image collection part of a mobile terminal configured to communicate with the display device in accordance with an exemplary embodiment.
Figure 3:
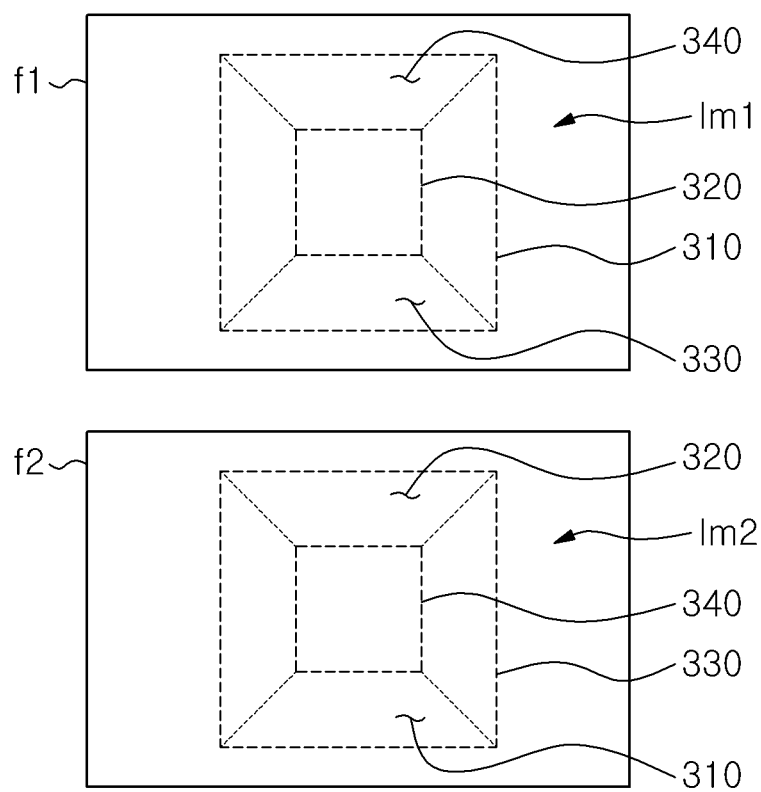
FIG. 3 is an exemplary view illustrating image collection from the first image collection part of the display device and the second image collection part of the mobile terminal configured to communicate with the display device in accordance with an exemplary embodiment.

FIG. 2 is an exemplary view illustrating a collection area of the images collected from the first image collection part 130 of the display device 100 and the second image collection part 230 of the mobile terminal 200 in accordance with an exemplary embodiment, and FIG. 3 is an exemplary view illustrating image collection from the first image collection part 130 of the display device 100 and the second image collection part 230 of the mobile terminal 200 in accordance with an exemplary embodiment.

As illustrated in FIG. 2, the image collection area of the first image collection part 130 and the second image collection part 230 is a common area thereof, and has a certain-sized space area including the object image of a whole image collected by the first image collection part 130 and the second image collection part 230.

That is, the image collection area is a recognition space area 300 for recognizing the object indicating the operation command, and a precise image of the object may be obtained by collecting the image of the object located in the recognition space area.

According to an exemplary embodiment, the recognition space area 300 may be formed in many different types of shapes, such as, for example, a hexahedral shape, a spherical shape, or the like. Among these exemplary types of shapes, the hexahedral recognition space area will be described below as an example.

The hexahedral recognition space area includes a plurality of surfaces 310, 320, 330, and 340, 350 and 360.

The plurality of surfaces include a first surface 310 configured to face the first image collection part 130, a second surface 320 disposed to be spaced apart from and opposite to the first surface, a third surface 330 configured to face the second image collection part 230, and a fourth surface 340 disposed to be spaced apart from and opposite to the third surface.

Here, the first surface 310 is parallel with the second surface 320 and perpendicular to the third surface 330 and the fourth surface 340.

The third surface 330 is parallel with the fourth surface 340 and perpendicular to the first surface 310 and the second surface 320.

That is, the third surface 330 and fourth surface 340 are formed as planes respectively oriented along an X-axial direction and a Y-axial direction, and the first surface 310 and the second surface 320 are formed as planes respectively oriented along the Y-axial direction and a Z-axial direction.

As illustrated in FIG. 3, from the perspective of the first image collection part 130, the image in an area included within a first image angle range of a front area facing an image-taking surface of the first image collection part 130 is collected as a whole image f1.

Further, from the perspective of the second image collection part 230, the image in a second image angle area of a front area facing an image-taking surface of the second image collection part 230 is collected as a whole image f2.

The display device 100 collects the image between the first surface 310 and the second surface 320, when collecting the object image in the recognition space area 300 from a first direction using the first image collection part 130, and also collects the image between the third surface 330 and the fourth surface 340, when collecting the object image in the recognition space area 300 from a second direction using the second image collection part 230.

According to an exemplary embodiment, the image between the third surface 330 and the fourth surface 340 is an image transmitted from the mobile terminal 200.

Therefore, the display device 100 may collect a first image Im1 from the first direction and a second image Im2 from the second direction different from the first direction.

Further, the first direction and the second direction are perpendicular to each other, and the first image Im1 and the second image Im2 are the images collected from the directions perpendicular to each other.

As described above, the display device 100 obtains the object images in the virtual recognition space area 300 from the different directions, calibrates the obtained two images, and then recognizes a motion based on a calibration result.

Therefore, an image processing time for obtaining the object image of the whole images collected from the first and second image collection parts 130 and 230 may be reduced.

The images collected as described above are displayed through the display panel 110 of the display device 100. This feature will be described with reference to FIG. 4.

Figure 4:
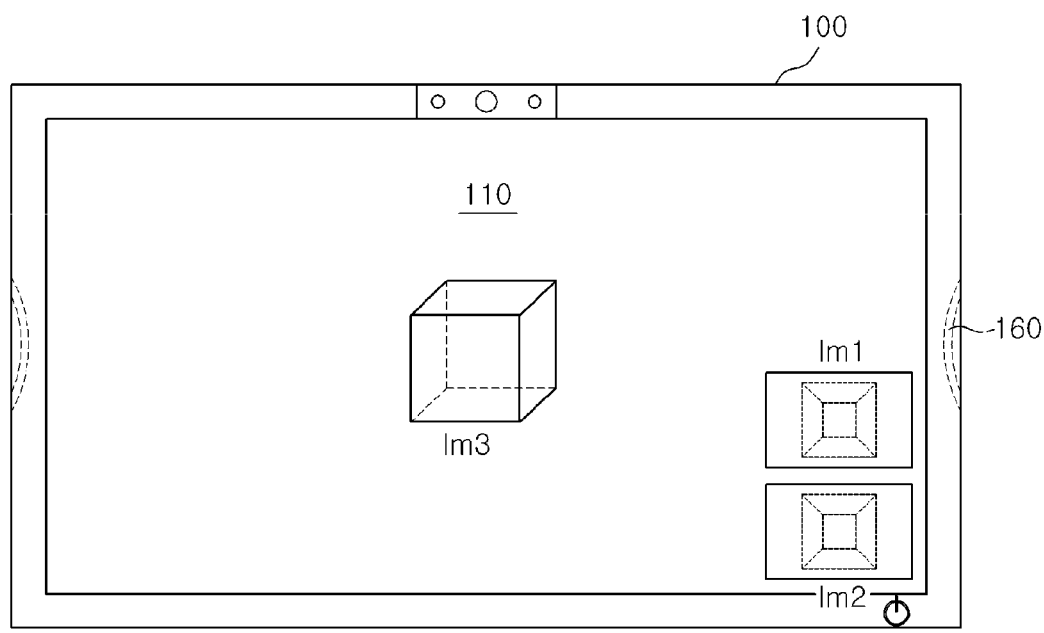
FIG. 4 is an exemplary view illustrating a state of displaying the collected images of the display device in accordance with an exemplary embodiment.

FIG. 4 is an exemplary view illustrating a state of displaying the collected images of the display device 100 in accordance with an exemplary embodiment.

As illustrated in FIG. 4, the display device 100 displays the first image Im1 collected from the first image collection part 130 and the second image Im2 collected from the second image collection part 230 together with the recognition space area on the display panel 110, and also displays a third image Im3 obtained by calibrating the first image Im1 and the second image Im2.

Therefore, the display device 100 enables the user to check whether the object for inputting the operation command is located at a position which may enable the display device 100 to easily collect the image.

For example, the display device 100 may detect a user's hand located in the recognition space area 300.

Figure 5:
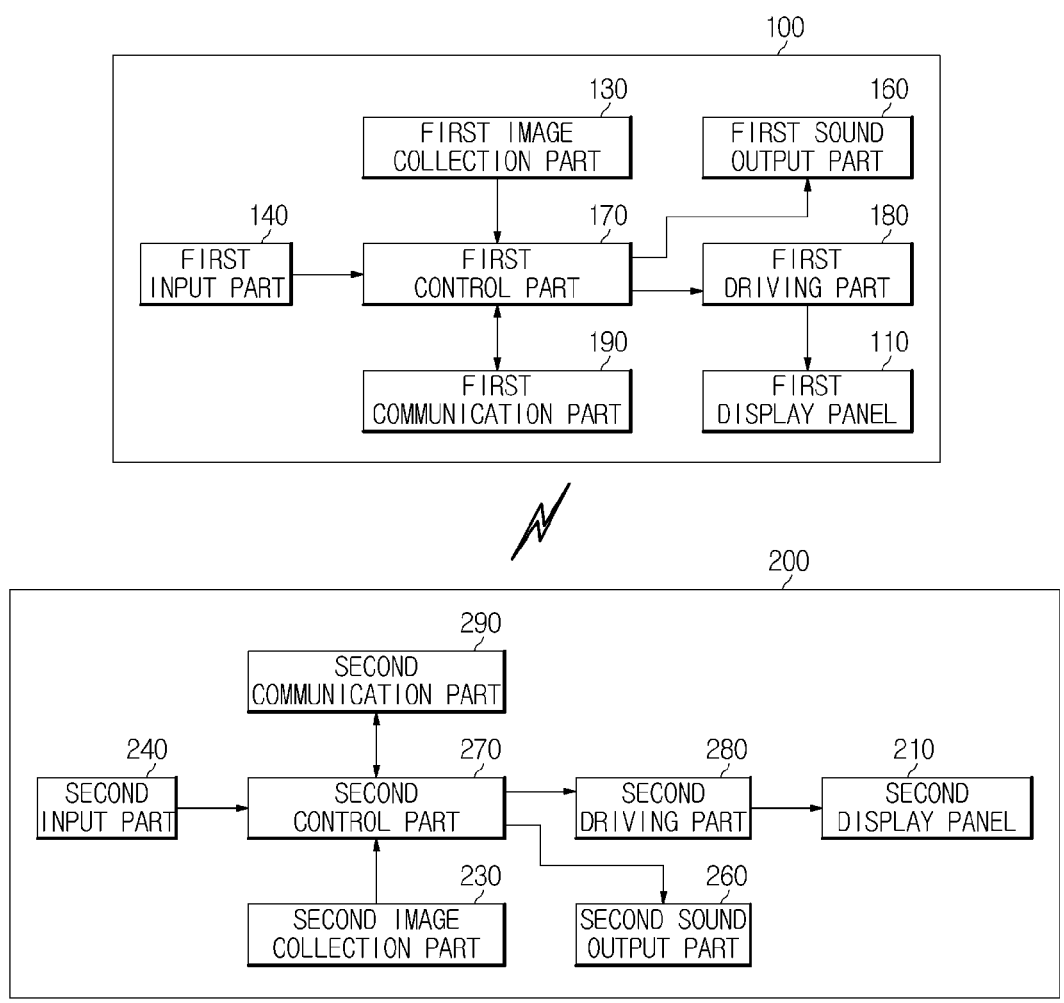
FIG. 5 is a control block diagram of the display device and the mobile terminal configured to communicate with the display device in accordance with an exemplary embodiment.

FIG. 5 is a control block diagram of the display device and the mobile terminal configured to communicate with the display device in accordance with an exemplary embodiment.

The display device 100 operates the first display panel 110 based on at least one of a signal generated by the first input part 140 and an interaction signal generated by a user's action.

According to an exemplary embodiment, the interaction signal includes a motion made by the user.

The display device which receives the operation command through the motion made by the user, as described above, includes the first display panel 110, the first image collection part 130, the first control part 170, a first driving part (first driver) 180, and a first communication part (first communicator) 190.

Further, the display device also includes the first input part 140 and the first sound output part 160, and may additionally include the first sound collection part 150.

The first display panel 110 displays the image based on a driving signal transmitted from the first driving part 180. According to an exemplary embodiment, the image may be a menu image, an external broadcasting image, or a content image received through the Internet and/or some other type of network (e.g., LAN).

When an input mode is an interaction mode, the first image collected by the first image collection part 130 and the second image collected by the second image collection part 230 are displayed on a partial area of the first display panel 110.

According to an exemplary embodiment, the first image is the object image collected from the first direction with respect to the object, and the second image is the object image collected from the second direction with respect to the object. The first display panel 110 displays each of the object images in the recognition space area.

Further, the first display panel 110 displays the third image obtained by calibrating the first image and the second image.

Moreover, the first, second, and third images may be displayed to be overlapped with the broadcasting image or the content image which is being displayed.

The first image collection part 130 is electrically connected with the first control part 170, collects the user's image based on a command of the first control part 170, and transmits a signal of the collected image to the first control part 170.

According to an exemplary embodiment, the user's image may be an image of the user's hand which inputs the operation command. It is understood, however, that the exemplary embodiments are not limited to the user's image being an image of the user's hand, and the user's image may instead be other portions of the user's body, or another object altogether.

The first input part 140 includes, for example, a power on/off button, a channel/volume button, a screen control button, and so on, and transmits a signal of the button operated by the user to the first control part 170.

Also, the first input part 140 may further include an input mode button, and may receive a command indicating the input mode by which the operation command is processed, to accordingly operate a device such as the first display panel 110 and the first sound output part 160.

The first input part 140 may transmit an operation signal of the input mode button to the first control part 170.

According to an exemplary embodiment, the input mode may be several types of modes, including, for example, an operation mode using the remote controller (not shown) or the first input part 140, and the interaction mode using the recognition of the user's motion.

The first sound collection part 150 is electrically connected with the first control part 170, collects the user's sound based on a command of the first control part 170, and transmits a signal of the collected sound to the first control part 170.

That is, the display device may analyze the collected user's sound, recognize the operation command based on the analyzed sound, and control an operation of the display panel based on the recognized operation command.

The first sound output part 160 outputs the sound based on the command of the first control part 170. According to an exemplary embodiment, the sound may be a broadcasting sound, or a sound of the content received through the Internet, although is not limited thereto.

The first control part 170 controls the operation of the first display panel 110 to be turned on, when a power-on signal is input, and controls the operation of the first display panel 110 to be turned off, when a power-off signal is input.

When the operation signal of the input mode is received, the first control part 170 determines whether the input mode is the operation mode or the interaction mode, and when the first control part 170 determines that the input mode is the operation mode, controls the operation of the first image collection part 130 to be turned off determines the operation command corresponding to the operation signal input through the first input part 140 or the remote controller (not shown), and controls the operation of the first display panel 110 based on the determined operation command.

When the first control part 170 determines that the input mode is the interaction mode, the first control part 170 controls the operation of the first image collection part 130 to be turned on, controls the first communication part 190 to transmit a preparatory signal for performing the interaction mode to a previously paired mobile terminal 200, and controls the first display panel 110 to display guide information relative to the interaction mode to the user through the first display panel 110.

For example, the display device 100 guides the user to locate the mobile terminal 200 at a front side of the display device 100, and also transmits arrangement guide information to the mobile terminal 200.

Further, the input mode may receive an input based on the object image collected from the first image collection part 130.

That is, even when the input mode is the operation mode, the first control part 170 may operate the first image collection part 130, periodically collect the image through the first image collection part 130, determine whether a motion of the collected image corresponds to the interaction mode, and then convert the operation mode into the interaction mode when the motion of the collected image corresponds to the interaction mode.

Further, in a state in which the input mode is the interaction mode, the first control part 170 may operate the first image collection part 130, periodically collect the image through the first image collection part 130, determine whether a motion of the collected image corresponds to the operation mode, and then convert the interaction mode into the operation mode when the motion of the collected image corresponds to the operation mode.

In the state in which the input mode is the interaction mode, when it is determined that communication with the mobile terminal 200 is normally performed, the first control part 170 obtains the first image in the recognition space area 300 of the images collected through the first image collection part 130, obtains the second image in the recognition space area 300 of the images collected through the second image collection part 230, calibrates the obtained first and second images in the recognition space area 300, and generates the third image corresponding to the calibration result.

Further, the calibrated first and second images are images which are collected at the same time.

The first control part 170 controls displaying of the first image of the object located in the recognition space area 300 when controlling displaying of the image collected from the first image collection part 130, and controls displaying of the second image of the object located in the recognition space area 300 when controlling displaying of the image collected from the second image collection part 230 of the mobile terminal 200.

Further, the first control part 170 controls displaying of the generated third image.

The first control part 170 processes the third image, recognizes the motion of the processed third image, determines the operation command corresponding to the recognized motion, and controls the operation of a device such as the first display panel 110 and the first sound output part 160 based on the determined operation command.

According to an exemplary embodiment, the operation command includes a function change and an output information change of the displaying of the image, the outputting of the sound, and so on, and the motion includes a shape of the object and a location change of the object.

The first control part 170 may control the input mode based on a signal transmitted from the mobile terminal 200. That is, the first control part 170 may receive a command for starting the interaction mode and a command for terminating the interaction mode from the mobile terminal 200.

The first driving part 180 drives the first display panel 110 based on the command of the first control part 170.

The first communication part 190 performs the communication with the mobile terminal 200 based on the command of the first control part 170.

The first communication part 190 transmits a command signal for starting the interaction mode to the mobile terminal 200, receives the image collected from the mobile terminal 200, and then transmits the collected image to the first control part 170.

The display device may further include a memory part (not shown) configured to store the operation command corresponding to the motion.

The mobile terminal 200 starts or terminates the interaction mode based on a signal input through the second input part 240 and a second communication part 290 (e.g., second communicator).

The mobile terminal 200, which is interlocked with the display device 100 when the display device 100 performs the interaction mode, includes the second image collection part 230, a second control part (second controller) 270, and the second communication part 290.

The mobile terminal 200 further includes the second display panel 210, the second input part 240, the second sound output part 260, and a second driving part (second driver) 280, and may further include the second sound collection part 250.

The second display panel 210 displays the image based on a driving signal transmitted from the second driving part 280. According to an exemplary embodiment, the image may be an image of the guide information relative to the interaction mode, the menu image, and the content image received through the Internet.

The second image collection part 230 is electrically connected with the second control part 270, collects the user's image based on a command of the second control part 270, and transmits a signal of the collected image to the second control part 270.

According to an exemplary embodiment, the user's image may be the image of the user's hand which inputs the operation command.

The second input part 240 includes the power on/off button, the interaction mode button, and so on, and transmits a signal of the button operated by the user to the second control part 270.

The second sound collection part 250 is electrically connected with the second control part 270, collects the user's sound based on a command of the second control part 270, and transmits a signal of the collected sound to the second control part 270.

The second sound output part 260 outputs the sound based on the command of the second control part 270. According to an exemplary embodiment, the sound may be a voice of a person at the other end of the line when calling, or the sound of the content received through the Internet, although is not limited thereto.

The second control part 270 controls the operation of the second display panel 210 to be turned on when the power-on signal is input, and controls the operation of the second display panel 210 to be turned off when the power-off signal is input.

When the command signal for starting the interaction mode is received through the second communication part 290 or input through the second input part 240, the second control part 270 controls the operation of the second image collection part 230 to be turned on, controls communication with a previously paired display device 100, and controls the second display panel 210 to display the guide information relative to the interaction mode to the user through the second display panel 210.

For example, the mobile terminal 200 guides the user to locate the mobile terminal 200 at a front side of the display device, and also guides arrangement guide information of the mobile terminal 200.

When it is determined that communication with the display device 100 is normally performed, the second control part 270 controls the second communication part 290 so that the image collected through the second image collection part 230 is transmitted to the display device 100.

The second driving part 280 drives the second display panel 210 based on the command of the second control part 270.

The second communication part 290 performs the communication with the display device 100 based on the command of the second control part 270.

The second communication part 290 receives or transmits the command signal for starting the interaction mode to the display device 100, and transmits the collected image to the display device 100.

Figure 6:
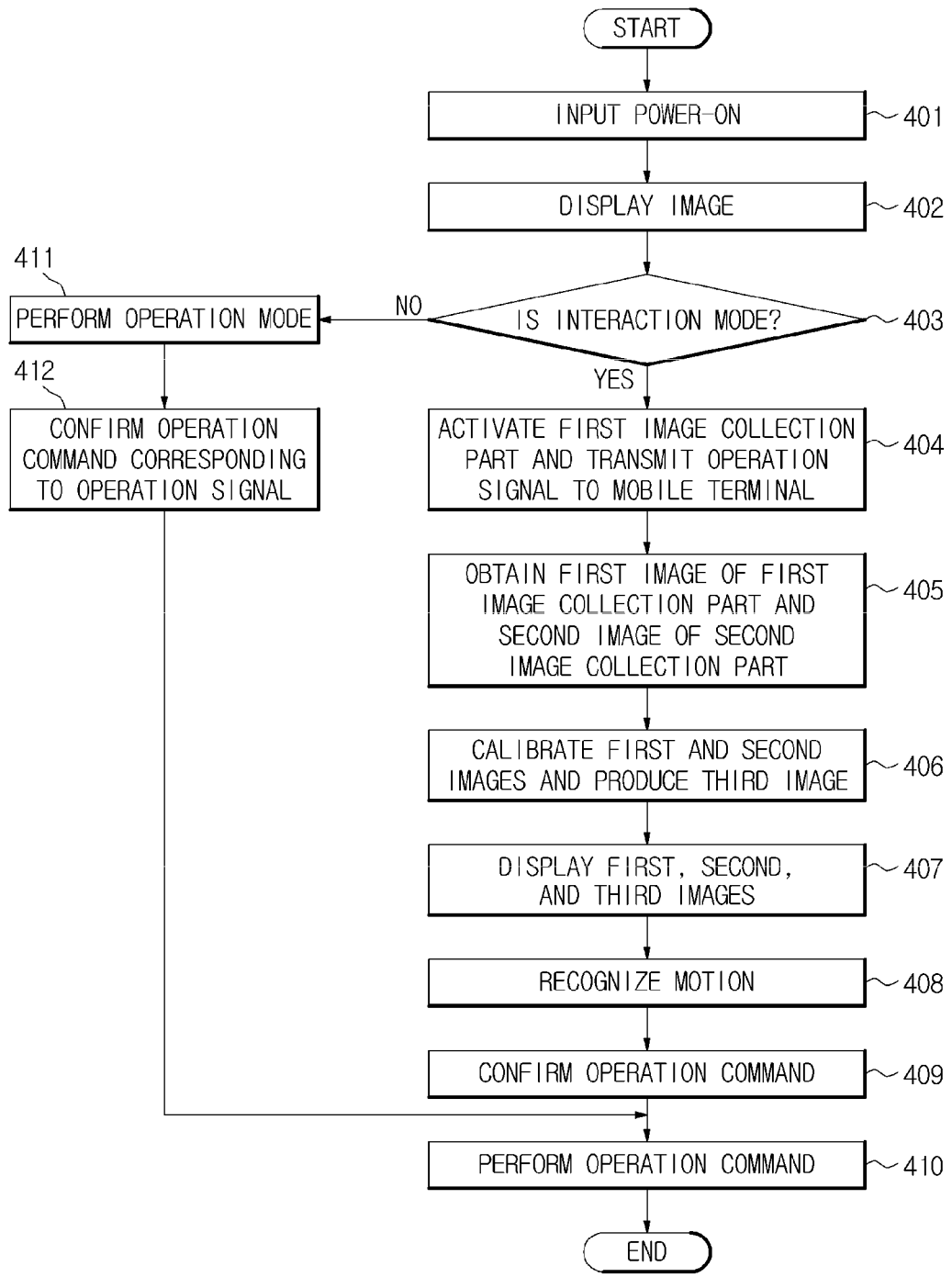
FIG. 6 is a control flowchart of the display device in accordance with an exemplary embodiment.

FIG. 6 is a control flowchart of the display device in accordance with an exemplary embodiment.

The control process of the display device will be described with reference to FIGS. 6 through 10.

When the power-on signal is received (401), the display device 100 operates the first display panel 110, and displays an image, such as the menu image, the broadcasting image, or the content image (402).

In the display device 100, the operation mode, which is a mode that receives the operation command through the first input part 140 or the remote controller (not shown), is performed in a default input mode.

That is, when the display device 100 is woken up in a standby mode, the operation mode is performed in the input mode.

The display device 100 determines whether the input mode is the interaction mode (403).

That is, the display device 100 determines whether the command signal for starting the interaction mode is input from one of the first input part 140, the first image collection part 130, and the mobile terminal 200, and converts the input mode from the operation mode to the interaction mode if it is determined that a command signal for starting the interaction mode is input.

According to an exemplary embodiment, the process of receiving a command signal indicating the interaction mode through the first image collection part 130 includes a process of recognizing the motion of the images collected from the first image collection part 130 and the second image collection part 230 and determining whether the recognized motion corresponds to the interaction mode.

The process of receiving a command signal indicating the interaction mode through the first input part 140 includes a process of receiving the operation signal when the input mode button is pressed.

The process of receiving a command signal indicating the interaction mode through the mobile terminal 200 includes a process of receiving the operation signal of the interaction mode input to the mobile terminal 200.

When the input mode is the interaction mode, the display device 100 activates the first image collection part 130 and transmits the operation signal for performing the interaction mode to the previously paired mobile terminal 200 (404).

The display device 100 displays the guide information relative to the interaction mode to the user through the first display panel 110.

For example, the display device 100 guides the user to locate the mobile terminal 200 at a front side of the display device 100, and also guides the location information of the mobile terminal 200 and direction information of the second image collection part 230 when the user is arranging the mobile terminal 200.

In the state in which the input mode is the interaction mode, when it is determined that the communication with the mobile terminal 200 is normally performed, the display device 100 collects a first directional image using the first image collection part 130, and receives a second directional image transmitted from the mobile terminal 200.

Then, the display device 100 obtains the first image in the recognition space area 300 of the images collected through the first image collection part 130, and obtains the second image in the recognition space area 300 of the images collected through the second image collection part 230 (405).

This feature will be described with reference to FIG. 7.

Figure 7:
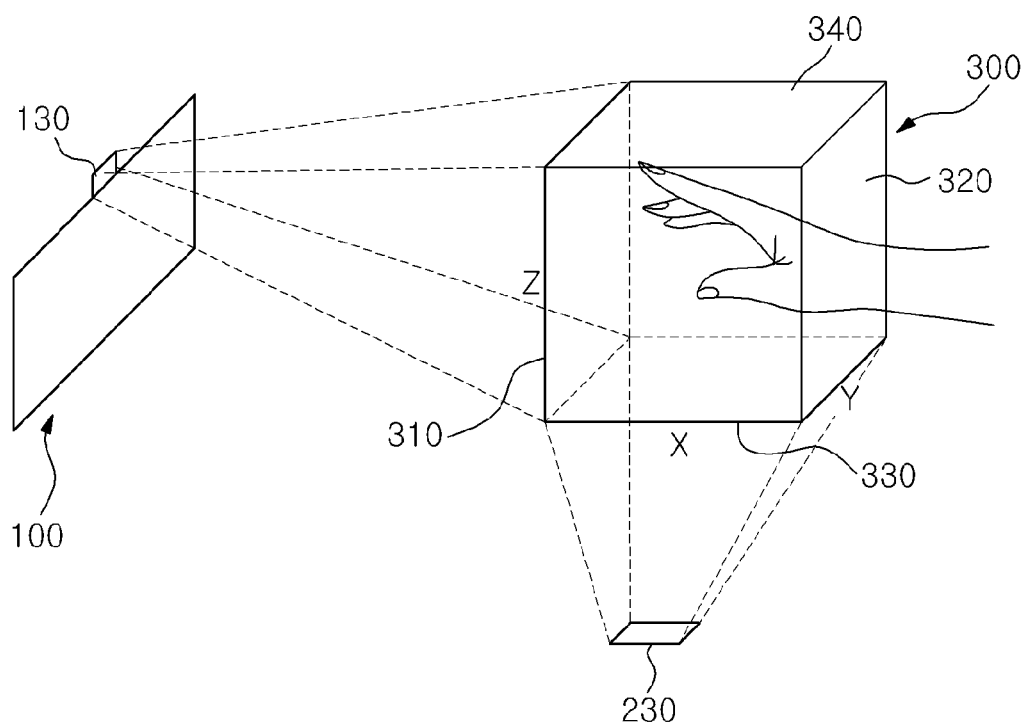
FIG. 7 is an exemplary view illustrating the image collection of an object at the display device and the mobile terminal in accordance with an exemplary embodiment.

As illustrated in FIG. 7, the first and second image collection parts 130 and 230 form a virtual recognition space area 300.

The virtual recognition space area 300 is an area in which an area capable of being captured by the first image collection part overlaps with an area capable of being captured by the second image collection part, e.g., an area in which images of the same object may be captured.

That is, when the object is the user's hand which inputs the operation command, the user locates his or her hand in the recognition space area 300.

At this time, the first image collection part 130 of the display device and the second image collection part 230 of the mobile terminal collect the images of the hand in the recognition space area 300, and the first image collection part 130 collects the first image of the hand in the first direction, and the second image collection part 230 collects the second image of the hand in the second direction.

The first image collected from the first image collection part 130 includes the image of the hand between the first and second surfaces of the recognition space area, and the second image collected from the second image collection part 230 includes the image of the hand between the third and fourth surfaces of the recognition space area 300.

In other words, the display device obtains the first image of the surface 310 corresponding to the y-axial and z-axial directions, which is located within a predetermined distance in the x-axial direction, and obtains the second image of the surface 330 corresponding to the x-axial and y-axial directions, which is located within a predetermined distance in the z-axial direction.

The display device 100 calibrates the obtained first and second images in the recognition space area 300, and generates (e.g., produces) the third image corresponding to the calibration result.

The display device 100 displays the first image of the object located in the recognition space area 300 on the first display panel 110 so that the user can recognize whether the hand is exactly located in the recognition space area 300, and also displays the second image of the object located in the recognition space area 300. Further, the display device 100 displays the third image (407).

The display device processes the third image, recognizes the motion of the processed third image (408), confirms the operation command corresponding to the recognized motion (409), and operates at least one device, such as the first display panel 110 and the first sound output part 160, based on the confirmed operation command (410).

According to an exemplary embodiment, the motion includes the shape and the location change of the object.

As an example, the display device performs a volume-up command when the recognized motion corresponds to a volume-up motion, and performs a volume-down command when the recognized motion corresponds to a volume-down motion.

Further, the display device performs the volume-down command when the recognized motion is a motion in which the location of the object is moved down, and performs the volume-up command when the recognized motion is a motion in which the location of the object is moved up.

Figure 8:
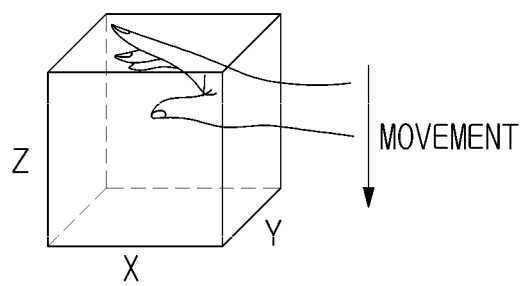
FIG. 8 is an exemplary view illustrating a state of recognizing a motion of the object at the display device in accordance with an exemplary embodiment.
Figure 8:
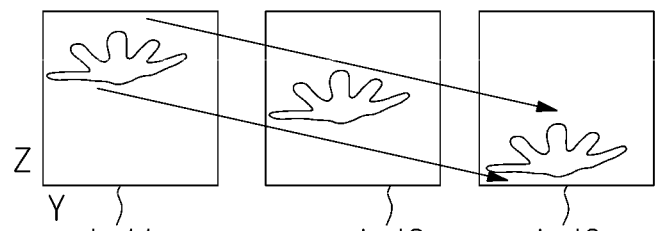
Figure 8:
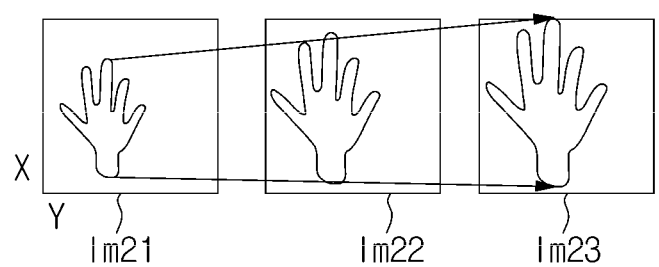

A motion recognition configuration according to the location change of the hand will be described with reference to FIG. 8.

The display device collects the first images Im11, Im12, and Im13 and the second images Im21, Im22, and Im23 through the first and second image collection parts 130 and 230 during a predetermined period of time, and confirms changes of the first images Im11, Im12, and Im13 and the second images Im21, Im22, and Im23 according to the change of time.

That is, the display device 100 determines that the first images Im11, Im12, and Im13 in the recognition space area 300, which are periodically collected from the first image collection part 130, are moved down according to the change of time, and further determines that the sizes of the second images Im21, Im22, and Im23 in the recognition space area 300, which are periodically collected from the second image collection part 230, gradually become larger.

The display device 100 combines change information of the first and second images, determines that the image of the hand in the recognition space area 300 is moved down, based on the combined information, and determines the operation command with respect to the motion in which the hand is moved down.

Also, the display device displays the channel/volume adjustment button, when the recognized motion is a motion for displaying the channel/volume adjustment button, and displays the Internet search window, when the recognized motion is a motion for the Internet search. It is understood many different types of buttons, icons, or other images may be displayed according to exemplary embodiments.

This feature will be described with reference to FIGS. 9 and 10.

Figure 9:
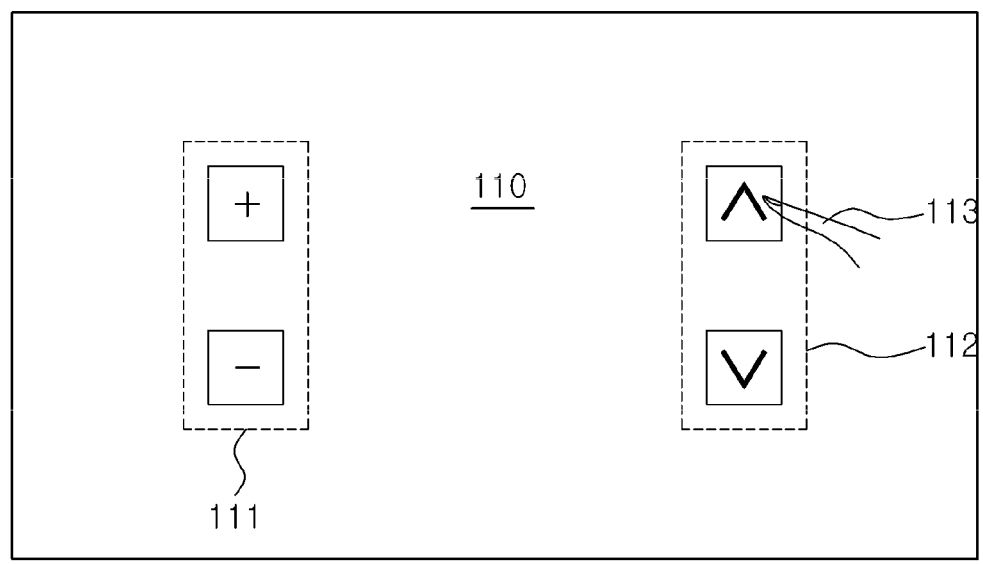
FIG. 9 is an exemplary view illustrating a state of displaying a channel adjustment button and volume adjustment button of the display device in accordance with an exemplary embodiment.

As illustrated in FIG. 9, when the recognized motion is a command for displaying the channel adjustment button and/or the volume adjustment button, the display device 100 displays a volume adjustment button 111 and/or a channel adjustment button 112 on the first display panel.

Then, the display device 100 calibrates the first and second images obtained through the first and second image collection parts 130 and 230, obtains the third image, determines a point designated by the user based on the obtained third image, marks the determined point with a predetermined icon 113, confirms a button located at the determined point, and then performs the operation command corresponding to the confirmed button.

According to an exemplary embodiment, the predetermined icon may be many different types of icons, such as, for example, an image of a finger, a cursor, a point, and so on.

Figure 10:
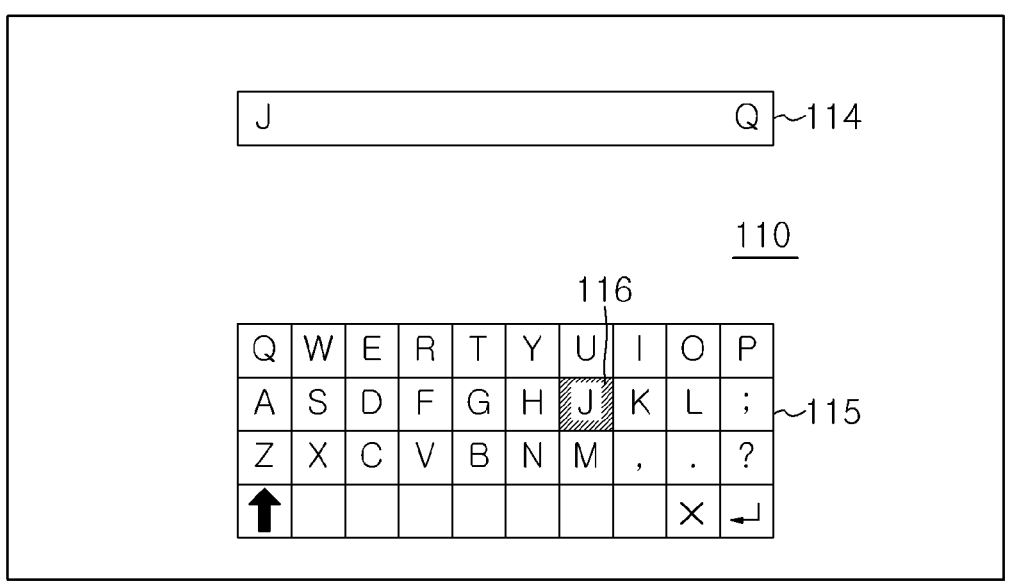
FIG. 10 is an exemplary view illustrating a state of displaying an Internet search window of the display device in accordance with an exemplary embodiment.

As illustrated in FIG. 10, when the recognized motion is the command for the Internet search, the display device 100 displays an Internet search window 114 and a keyboard 115, in which a plurality of keys having a plurality of pieces of operation command information are arranged, on the first display panel 110.

Then, the display device 100 calibrates the first and second images obtained through the first and second image collection parts 130 and 230, obtains the third image, determines a point designated by the user based on the obtained third image, marks the determined point with a predetermined icon 116, confirms a button located at the determined point, confirms a key corresponding to the confirmed button, and then displays information of the confirmed key on the Internet search window 114.

According to an exemplary embodiment, the predetermined icon may be many different types, including, for example, an image of a finger, a cursor, a pointer, other colors, and so on.

As described above, when receiving the operation command of the keyboard, accuracy of the key input may be enhanced by further obtaining the object image using the second image collection part 230.

Figure 11:
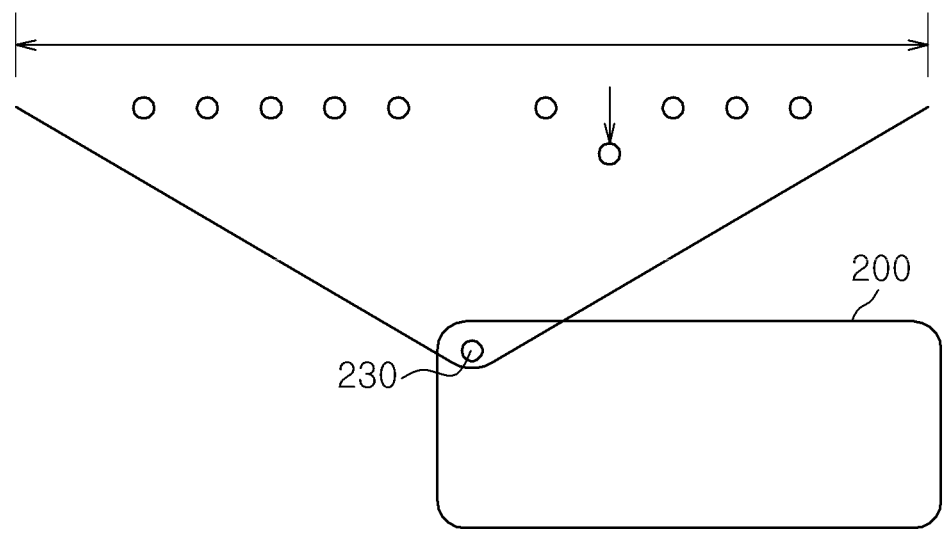
FIG. 11 is an exemplary view illustrating a state of recognizing the motion of the object upon a key input operation for Internet searching in the display device in accordance with an exemplary embodiment.

As illustrated in FIG. 11, when ten fingers are located in the recognition space area 300, a location of the key intended to be operated by the user may be precisely determined by obtaining information of the finger having the greatest location movement among the fingers of the user's hand, the images of which are collected by the second image collection part 230.

The display device 100 maintains the operation mode until the interaction mode is selected in a state in which the power is turned on.

That is, when the input mode is the operation mode, the display device 100 performs the operation mode in which the operation command is input and received through the first input part or the remote controller (411), confirms the operation command corresponding to an operation signal of the first input part or the remote controller (412), and performs the confirmed operation command (410).

Further, the display device 100 determines whether a signal terminating the interaction mode or converting the input mode is input, and while performing the interaction mode, terminates the interaction mode when the signal of terminating the interaction mode or converting the input mode is input, inactivates the first image collection part 130, and then transmits the interaction mode termination signal to the mobile terminal 200.

According to an exemplary embodiment, the signal terminating the interaction mode or converting the input mode may be received from one of the first image collection part 130, the first input part 140, and the mobile terminal 200.

That is, in the state in which the input mode is the interaction mode, the display device 100 may determine whether the motion of the image collected by the first image collection part 130 is the motion corresponding to the operation mode, and then convert the interaction mode into the operation mode when it is determined that the motion of the collected image is the motion corresponding to the operation mode.

The display device 100 performs a process of receiving the operation signal of the input mode button through the first input part 140, or a process of receiving the command signal for terminating the interaction mode from the mobile terminal 200.

Figure 12:
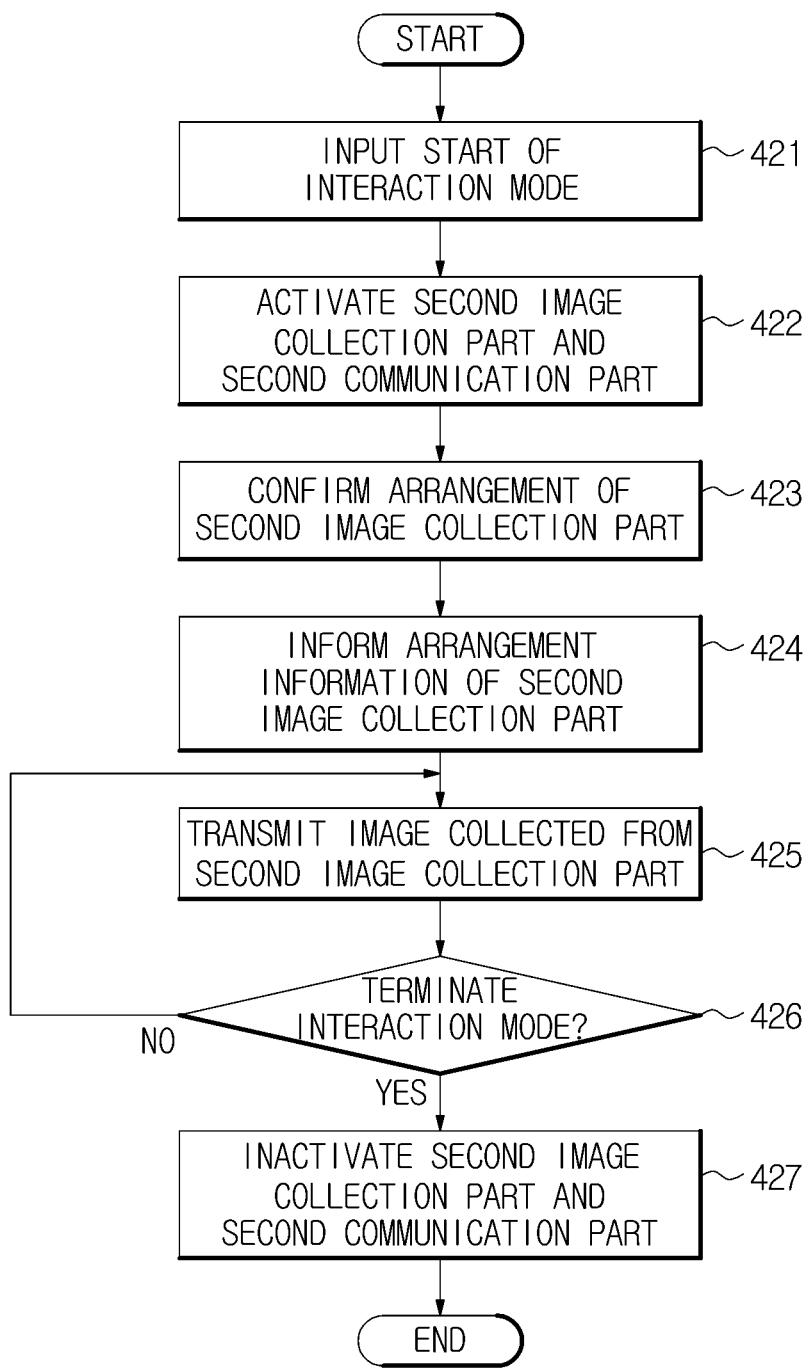
FIG. 12 is a control flowchart of the mobile terminal configured to communicate with the display device in accordance with an exemplary embodiment.

FIG. 12 is a control flowchart of the mobile terminal 200 configured to communicate with the display device 100 in accordance with an exemplary embodiment.

When the power-on signal is input, the mobile terminal 200 controls the operation of the second display panel 210 to be turned on.

The mobile terminal 200 performs the interaction mode when the signal of starting the interaction mode is input to the second communication part 290 and the second input part 240 (421). At this time, the mobile terminal 200 activates the second image collection part 230.

That is, the mobile terminal 200 determines whether the signal of starting the interaction mode is received from the display device 100 through the second communication part 290, or whether the operation signal of the interaction mode is input to the second input part 240.

When a current mode is the interaction mode, the mobile terminal activates the second communication part 290, performs the communication with the display device 100, activates the second image collection part 230, and collects the image of the object (422).

Further, when the current mode is interaction mode, the mobile terminal 200 temporarily collects the image of the object using the second image collection part 230, confirms the arrangement with the display device 100 based on the temporarily collected image (423), and transmits (e.g., informs) the arrangement information of the second image collection part 230 to the user (424). This arrangement information may be output through the second display panel 210 or the second sound output part 260 of the mobile terminal 200.

Furthermore, since the user may confirm whether the arrangement of the mobile terminal 200 is correct through the second image displayed on the first display panel 110, the operation of transmitting the arrangement information of the mobile terminal 200 may be omitted.

When the current mode is the interaction mode, the mobile terminal transmits the image collected from the second image collection part 230 to the display device (425).

The mobile terminal determines whether the command signal for terminating the interaction mode is input (426), inactivates the second image collection part 230 and the second communication part 290 when it is determined that the command signal for terminating the interaction mode is input (427), and thus terminates the interaction mode.

According to an exemplary embodiment, the command signal for terminating the interaction mode is an operation signal input to the second input part 240 or a termination command signal received by the second communication part 290.

Then, when the power-off signal is input, the mobile terminal 200 controls the operation of the second display panel 210 to be turned off.

Since the motion and the location change of the object in the virtual recognition space area 300 are detected as described above, it is possible to intuitively and easily operate the display device 100.

According to an aspect of an exemplary embodiment, the virtual recognition space area 300 is designated, which enables the system to recognize the operation command of the user, and the images of the object collected in different directions are respectively displayed on the display device 100, and thus the user can recognize whether the object configured to input the operation command is located in the recognition space area 300.

Therefore, the user can intuitively and easily input the operation command.

Further, since the calibrated image is displayed on the display device 100, a user may confirm whether the motion made by the user is accurately recognized.

Further, the remote controller, the keyboard, or the like, having the plurality of pieces of operation command information, can be displayed and virtually used on the display device 100.

Therefore, the user can precisely input a command according to a user motion, and the display device 100 can increase the accuracy of the motion recognition and also precisely perform the operation intended by the user, thereby enhancing the user's satisfaction.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A display device comprising:
a display panel;
an image collector configured to generate a first image by capturing an object in a first direction;
a communicator configured to receive a second image that is generated by capturing the object in a second direction by a mobile terminal; and
a controller configured to process the first image and the second image together into a processed image, recognize a motion of the processed image, determine an operation command corresponding to the recognized motion, and control an operation of the display panel based on the determined operation command,
wherein the display panel is configured to display the first image and the second image simultaneously before the motion is recognized.

2. The display device according to claim 1, wherein the second direction is perpendicular to the first direction.

3. The display device according to claim 1, wherein the display panel is configured to display the first image and the second image, which are images of the object located, in a recognition space area.

4. The display device according to claim 3, wherein the recognition space area has a hexahedral shape.

5. The display device according to claim 4, wherein the recognition space area comprises a plurality of surfaces, and the plurality of surfaces comprise a first surface facing the display panel, a second surface opposite to the first surface, a third surface facing the mobile terminal, and a fourth surface opposite to the third surface.

6. The display device according to claim 5, wherein the first surface is parallel with the second surface, and perpendicular to the third and fourth surfaces.

7. The display device according to claim 3, wherein the display panel is configured to display the processed image which is captured in the recognition space area.

8. The display device according to claim 7, wherein the display panel is configured to display the processed image in a stereoscopic image.

9. The display device according to claim 1, wherein the display panel is configured to display an image of a plurality of keys having a plurality of respective operation commands, and display a pointer indicated by the processed image, and
the controller is configured to recognize the motion of the processed image when displaying the image of the plurality of keys, and determine a location of the pointer with respect to the plurality of keys based on the recognized motion.

10. The display device according to claim 1, wherein the first image is generated by the image collector and the second image is generated by the mobile terminal at a same time.

11. The display device according to claim 1, wherein the motion of the object is at least one of a motion of the object forming a shape and a location movement motion of the object.

12. The display device according to claim 1, wherein, in response to a command instructing the display device to operate in an interaction mode being input to the display device, the controller is configured to activate the image collector, and control the communicator to transmit a command signal starting the interaction mode to the mobile terminal.

13. The display device according to claim 1, further comprising an inputter to receive and input a command instructing the display device to operate in an interaction mode.

14. A mobile terminal comprising:
a communicator configured to perform communication with a display device;
an image collector configured to generate a first image by capturing an object in a different direction from a direction in which the display device captures the object to generate a second image; and
a controller configured to activate the image collector in response to a command instructing the mobile terminal to operate in an interaction mode being input to the mobile terminal, and control the communicator to transmit the first image to the display device, thereby enabling the display device to recognize a motion of the object based on the first image and the second image and display the first image and the second image simultaneously before the motion is recognized.

15. The mobile terminal according to claim 14, further comprising an inputter configured to receive and input the command instructing the mobile terminal to operate in the interaction mode.

16. The mobile terminal according to claim 14, wherein the controller is configured to analyze the first image and the second image, determine arrangement information indicating an arrangement of the mobile terminal with the display device based on the analyzed images, and output the determined arrangement information.

17. A display device comprising:
a display panel;
an image collector; and
a controller configured to process a plurality of images generated by capturing a view in different directions by the image collector and a mobile terminal together into a processed image, recognize a motion of the processed image, determine an operation command corresponding to the recognized motion, and to control an operation of the display panel based on the determined operation command,
wherein the display panel is configured to display the plurality of images simultaneously before the motion is recognized.

18. The display device according to claim 17, wherein the plurality of images are images of an object located in a previously set recognition space area, and the display is configured to display the plurality of images.

19. The display device according to claim 17, wherein, in response to a command instructing the display device to operate in an interaction mode being input to the display device, the controller is configured to transmit an activation signal to a plurality of collectors, and process the images transmitted from the plurality of image collectors together into the processed image.

20. A method of controlling a display device, the method comprising:
determining whether an input mode is an interaction mode;
activating an image collector in the display device in response to determining that the input mode is the interaction mode;
transmitting a command signal starting the interaction mode to an external mobile terminal;

generating a first image by capturing a view in a first direction;

receiving from a mobile terminal a second image generated in the mobile terminal by capturing the view in a second direction;

displaying the first image and the second image simultaneously;

generating a processed image by processing the first image and the second image recognizing a motion based on the processed image;

determining an operation command corresponding to the recognized motion; and controlling an operation of a display panel based on the determined operation command.

21. The method according to claim 20, wherein the first image is generated by the display device the second image is generated by the mobile terminal at the same time.

22. The method according to claim 20, wherein the first image and the second image are images of an object located in a previously set recognition space area.

23. The method according to claim 20, wherein the recognizing of the motion comprises recognizing at least one motion among a motion of an object forming a shape and a location movement of the object.

24. The display device of claim 1, wherein the display device is a television.

\* \* \* \* \*